Figure 2:
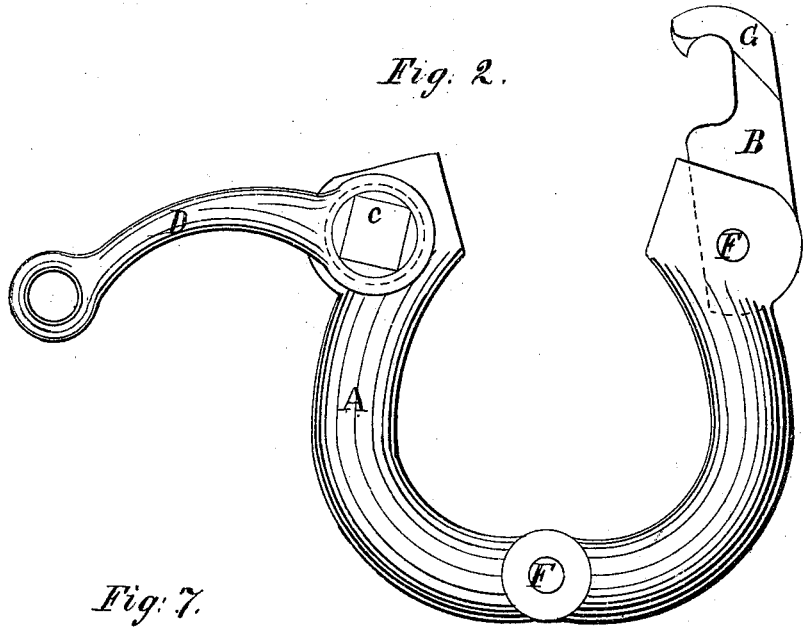
Figure 7:
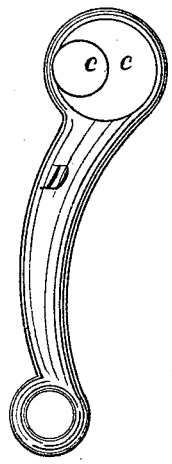

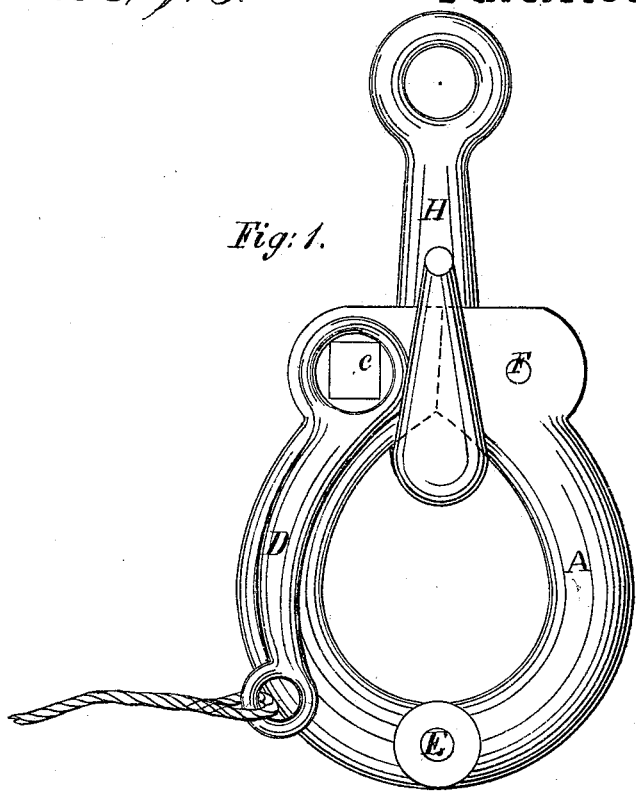
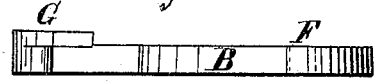
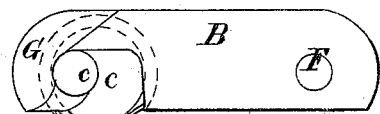
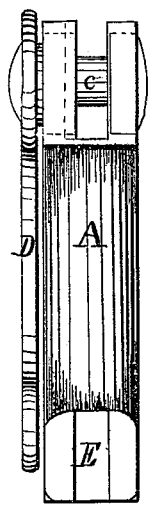
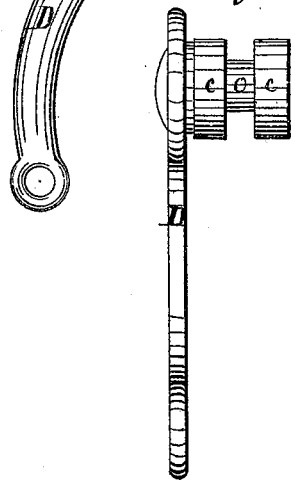

A. W. Roberts.
Boat Detaching.
N° 25,915.  Patented Oct. 25, 1859.

Witnesses:  Inventor:

UNITED STATES PATENT OFFICE.

ALBERT W. ROBERTS, OF HARTFORD, CONNECTICUT.

DISENGAGING-HOOK.

Specification of Letters Patent No. 25,915, dated October 25, 1859.

*To all whom it may concern:*

Be it known that I, ALBERT W. ROBERTS, of Hartford, county of Hartford, and State of Connecticut, have invented certain new and useful Improvements in Safety-Rings for Boats, &c.; and I do hereby declare that the same is described and represented in the following specification and drawings, and to enable others skilled in the art to make and use my improvement therein I will proceed to describe its construction and operation, referring to the drawings, in which the same letters indicate like parts in each of the figures.

The nature of my improvement in safety rings for boats, &c., consists in its construction, arrangement, and adaptation, for attaching and detaching, chain or cable, to, or from, a boat, &c., when necessary, by means of a jointed ring, hook link, crank, or lock pin, and trip lever, said hook link being provided with a bearer on one side thereof, which rests on the collar of the crank or lock pin, all combined to produce a more sure and speedy detachment of the crank or lock pin from the hook, when the trip lever is pulled, as hereinafter described.

Figure 8:
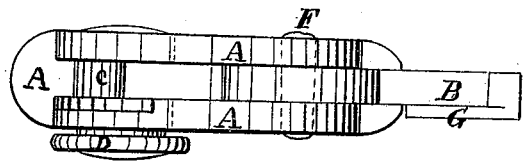

In the accompanying drawing Figure 1, shows a side view, with a hook inserted, as in use. Fig. 2, shows a detached open view thereof. Figs. 3, 4, 6 and 7 are detached portions of the same. Fig. 5, is an edge view. Fig. 8, is a top end view, with the hook open, and the trip lever hanging down by the side of the ring.

A, A, are two portions of a ring, secured together by means of a joint and pin F′ so as to allow them to open and close freely.

$c$, is a pin fitted into the upper enlarged and grooved portions of the ring A, at right angle therewith, and nearly in the center of the said pin is formed a crank or lock pin $c′$, the object of which is to receive the hook of the link E, and thereby link the two parts A, A, together.

E, is the hook link, one end of which is secured into the upper enlarged grooved portion of the other part A, by a pin F. On the side of said hook is formed a bearer G, which rests on the collar of the crank pin $c′$, the object of which is to produce an instant separation of the pin $c′$, from the hook by the action of the lever D.

D, is a trip lever secured to one end of the pin $c$.

I is a cord secured to the eye, in the end of the lever D, for the purpose of detaching, or unlocking the ring, at a distance therefrom. In using this ring, it is first secured to the boat, &c., by hook, chain, or other rigging, and the hook H, or a cable, or chain, used for a fall, is inserted into the ring. The hook link E is then closed down, with the movement of the trip lever D, and the lock pin $c′$, which completely and securely locks the ring together for use.

The hook H, or the chain or cable bears directly against the body, or the upper portion of the ring. Now if in an emergency or otherwise, it shall become necessary instantly to disengage the fall from the boat, &c., thus being lifted or lowered, it is produced by simply pulling upon the cord I in a line nearly from the center of the ring, which will instantly loosen the crank pin $c′$ in the link hook E, by the joint action of the collar, upon the bearer G.

I believe I have thus described the construction and operation, so as to enable a person skilled to make and use the same. The simple manner of its construction, and the efficiency of its operation, present the advantage to be derived by it over others now in use.

What I claim and desire to secure by Letters Patent as a new article of manufacture, is a hook consisting of the hook-link E with bearer G on its side, in combination with the jointed ring A, lever D crank pin $c′$, and collar $c$ substantially as described.

ALBERT W. ROBERTS.

Witnesses:
W. H. HAVENS,
JAS. RITTER.